March 6, 1973    R. F. MAHON    3,719,073
MASS FLOW METER
Filed Sept. 14 1970    3 Sheets-Sheet 1
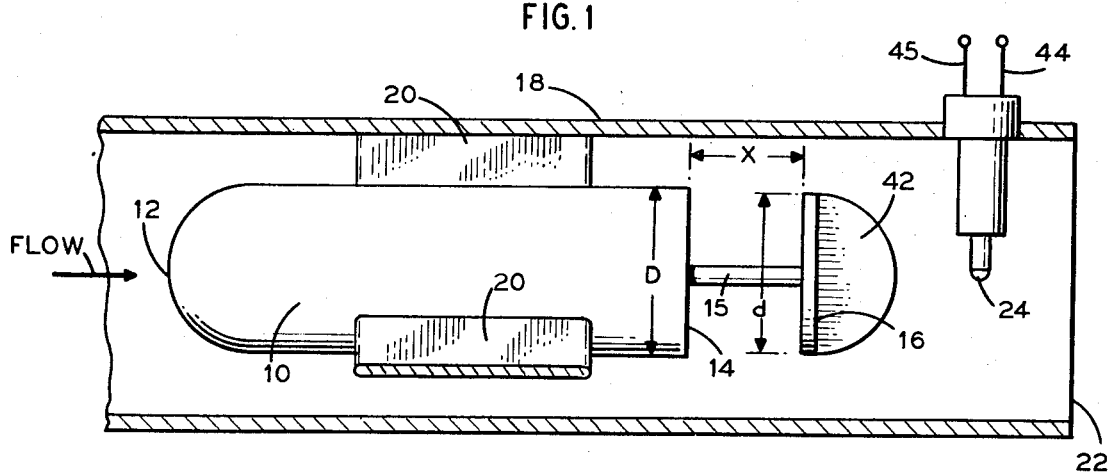
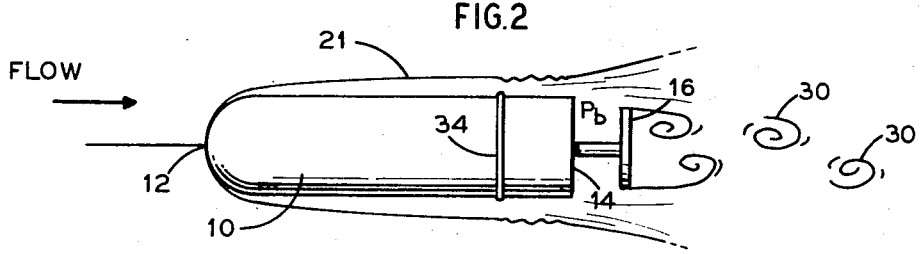
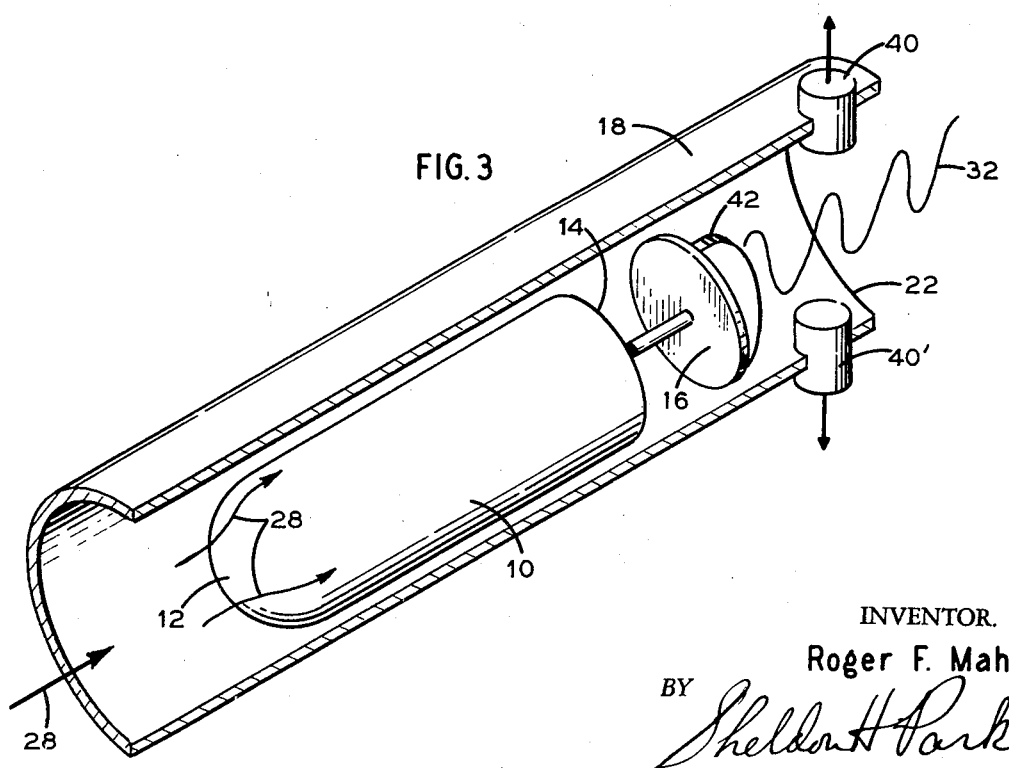
INVENTOR.
Roger F. Mahon
BY Sheldon H. Parker
ATTORNEY March 6, 1973 R. F. MAHON 3,719,073
MASS FLOW METER
Filed Sept. 14 1970 3 Sheets-Sheet 2

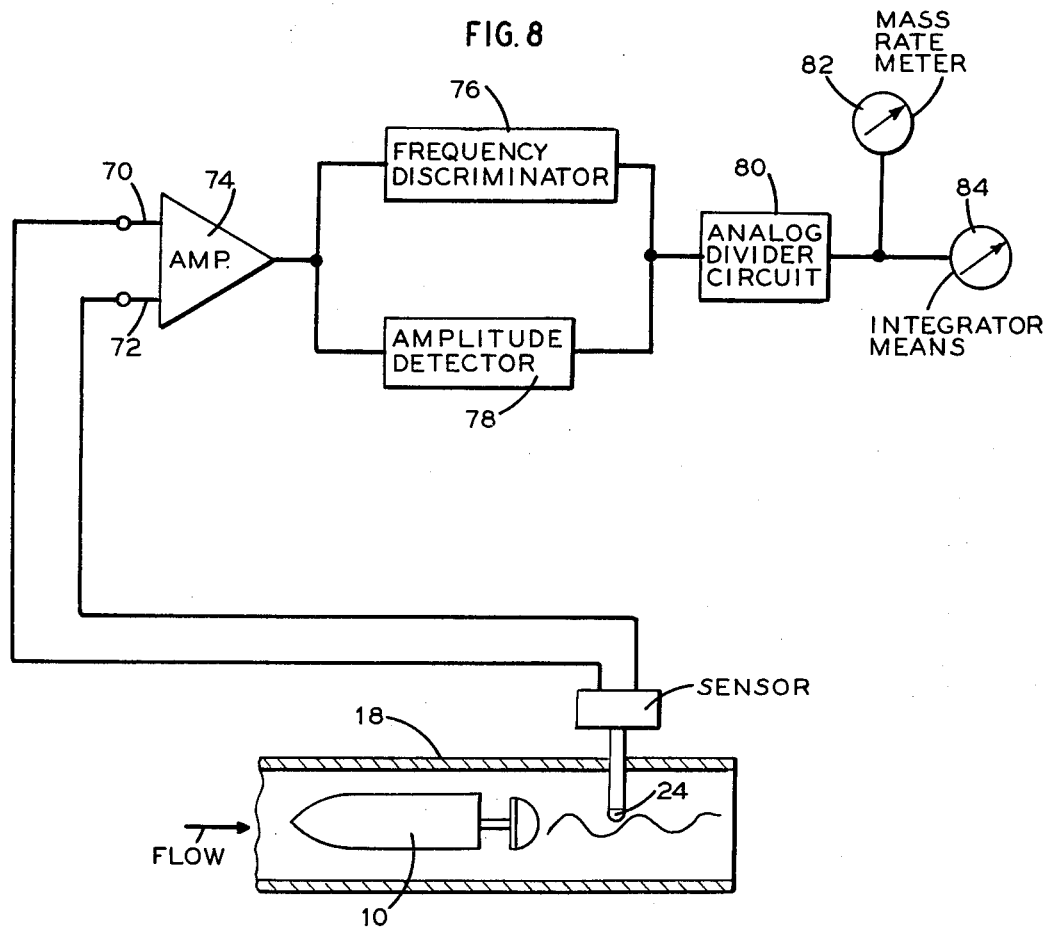

United States Patent Office 3,719,073
Patented Mar. 6, 1973

3,719,073
MASS FLOW METER
Roger F. Mahon, New Brunswick, N.J., assignor to
American Standard Inc., New York, N.Y.
Filed Sept. 14, 1970, Ser. No. 71,951
Int. Cl. G01f 1/00
U.S. Cl. 73—194 B          1 Claim

ABSTRACT OF THE DISCLOSURE

The invention relates to mass flow measurements. A cylindrical body having a curved nose at one end and a flat base at the other end is connected to a disc of smaller diameter, with the disc being centered coincident with the longitudinal axis of the body and being spaced axially from the base thereof. This assembly, when aligned axially at midstream of a flowing fluid with the nose pointed upstream, generates a downstream wake in which the fluid traces an oscillatory flow pattern. The mass flow of the fluid is determined from the frequency and amplitude of the oscillations. The frequency varies directly with the velocity of the fluid flow whereas the amplitude varies with the product of the fluid density and the square of the flow velocity. The device produces desirable low pressure losses and has a simple internal geometry.

BACKGROUND OF THE INVENTION

Field of the invention

This invention relates to mass flow measurement and more particularly, to a novel method of and apparatus for such measurements utilizing the oscillatory flow generated behind a bluff body.

Description of the prior art

Various basically different arrangements for metering or measuring the flow of fluids in closed conduits, or along confirmed paths, are known to the art. These different arrangements include, for example, inferential mechanical meters such as those of the turbine type, pressure differential meters, such as the Venturi, orifice plate, nozzle, Dall tube, laminar flow, and "Lo-Loss" meters, ultrasonic meters, and electromagnetic meters. All of these known types of measuring devices are subjected to various disadvantages such as, for example, high pressure losses, limitations to measuring the flow of liquids only and not being applicable to measuring the flow of gasses, errors due to swirl, relatively low accuracies, non-linear response characteristics, relatively long response times, limitations to small ranges of size, errors due to non-uniformity in the flow, difficulty in converting the output measurements into readily accessible form, high power requirements in the case of electromagnetic meters, and other errors, most of which are well known to those skilled in the art.

Each of the meters basically measures a volumetric flow of fluid. However, in many instances, it is more important to measure the flow mass of fluids. In many chemical applications, the various quantities of reactants are best specified according to mass. When such a situation arises and volumetric metering devices are employed it is necessary to convert the volume measurements to mass measurements. This may be accomplished by multiplying the volume measurements by the density of the fluid. Accordingly, volumetric fluid flow measuring devices may include indicating means calibrated to account for the density factor. However, it should be apparent that such devices have limited accuracies. It is well known that the density of a fluid is a function of the temperature of the fluid as well as the pressure exerted on the fluid. When the fluid is a gas the dependence of density on temperature and pressure is more pronounced. Hence, it is not possible to merely provide a constant of proportionality between the volume and the mass of the fluid being measured. Therefore, present indirect measurements of mass of fluid flow through the agency of volumetric measurements of fluid flow have only limited accuracy.

There have been proposed mass flow meters and also densitometers employing the measurement of the transit time of acoustic waves through a liquid. However, these devices require at least one active transducer to generate the acoustic waves. In addition to employing circuitry and power for driving the active transducer, further circuitry is required for analyzing and operating on signals generated by a receiving transducer. Therefore, ultrasonic measuring devices are relatively expensive to manufacture and operate.

U.S. Pat. 3,370,463 by Chanaud discloses a mass flow meter which is an improvement on the earlier types. In this device a swirling fluid passes through a fluid conduit which undergoes a cross-sectional area increase. This causes the axis of the swirling fluid to precess with respect to the major axis of the conduit, the precession being manifested by measurable pressure, velocity and temperature fluctuations in the fluid. Sensor means is employed which is responsive to the fluid parameter fluctuations in the precessing fluids. The mass flow of the fluid is determined from the frequency and amplitude of these fluctuations.

In that class of mass flow devices which are characterized by relatively high pressure losses, increased pumping capacity must be provided for any given pipeline in which such devices are installed. Obviously, larger pumps will entail greater installation expense and, hence, it is desirable that the contribution by any flow device to such losses be kept to a minimum.

Another consequence of such losses is that low pressure within a flow stream can potentially result in cavitation. This phenomenon occurs when the line pressure within the device falls below the vapor pressure of the fluid resulting in the random formation of small vapor pockets or bubbles. As such, the flow within the measuring device is disrupted and serious error frequently results.

In that class of measurement devices characterized by an intricate internal geometry, difficulty is encountered when the parts constituting such internal structure are attempted to be replaced in the field in a previously installed meter. Generally, the more complicated the interal structure, the greater the potential for dimensional variations from part to part. When such variation occurs, the entire meter must be removed from service and recalibrated; the replacement part cannot simply be installed with the expectancy that the original calibration will remain substantially unchanged.

BRIEF SUMMARY OF THE INVENTION

It has now been determined that mass flow can be measured by means of a cylindrical obstruction member and a disc-like member positioned downstream from the obstruction member by a predetermined distance. This assembly, when axially aligned in a flowing fluid, generates an oscillatory wake. Fluid parameter fluctuations of the wake are measured by sensing means located within it. The mass flow of the fluid is determined from the frequency and amplitude of the fluctuations.

An object of the present invention is to provide an improved mass flow meter.

It is another object of the invention to provide an improved mass flow measuring device which has a low pressure loss.

It is still another object of the invention to provide an improved mass flow measuring device which is simple in internal geometry.

BRIEF DESCRIPTION OF THE DRAWINGS

Additional objects and advantages of the invention will become apparent and the invention will be readily understood by reference to the following detailed description taken in conjunction with the accompanying drawings, wherein:

FIG. 1 is a longitudinal view, partly in cross-section, of the transducer assembly for measurnig mass flow of a fluid in accordance with the principles of the invention;

FIG. 2 is a longitudinal view of the cylinder portion and disc portion of the structure of FIG. 1 showing the boundary layer growth and interaction with the disc;

FIG. 3 is a perspective view, partially in section, of the structure of FIG. 1 including a pair of sensors for measuring the mass flow of the fluid in accordance with another embodiment of the invention;

FIG. 8 is a block diagram of electrical apparatus for processing the electrical signals generated by the transducers of FIGS. 1, 3, 5 and 6 to give indications of mass flow rate and total mass of fluid flowing through conduits in accordance with the principles of the invention.

DETAILED DESCRIPTION OF THE INVENTION

Figure 4:
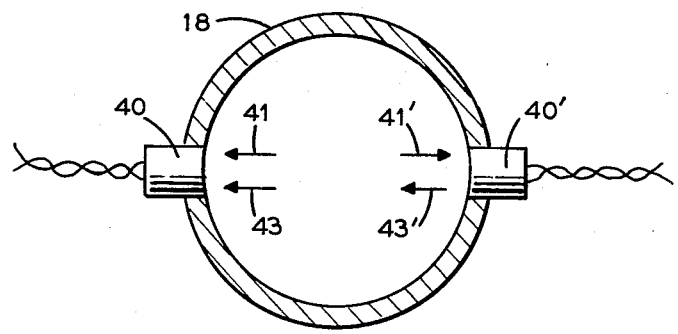
FIG. 4 is a cross-sectional view taken through the transducers of FIG. 3.

With reference to FIG. 1, the structural relation between the various elements are shown in accordance with the principles of the instant invention. A cylindrical body 10 has a curved nose 12 which can be either blunt as illustrated or pointed, and a flat base 14 at its opposite end. Attached to the base 14 is a flat disc 16 of smaller diameter "$d$" as compared to the diameter "$D$" of the cylindrical body 10. The center of the disc is coincident with the longitudinal central axis of the body 10 and is spaced axially from the base 14 by the distance "$x$."

The body 10 and attached disc 16 are suspended at the center of conduit 18 by three vanes 20 connecting the exterior surface of the body 10 to the interior wall of the conduit 18. As illustrated, the vanes pass through the central longitudinal axis of the body 10 and are angularly spaced apart by 120°. The dimensions of the vanes are not narrowly critical and are primarily dimensioned so as to minimize their flow obstruction while still providing the requisite structural strength.

The nose 12 faces a source of fluid flow and is pointed upstream with respect to the fluid flow and the disc 16 is pointed downstream and spaced a predetermined distance "$x$" facing the exit end 22 of the conduit 18, with the longitudinal axis of the body 10 substantially parallel to the mean axial fluid flow within conduit 18. Positioned downstream of the disc 16 but before the exit end 22 is an oscillation responsive or sensing element 24.

Since the flow is oscillating, there are pressure, temperature and velocity fluctuations present. Therefore, there are several methods by which the frequency and amplitude of the oscillation can be detected. A pressure sensitive means such as a diaphragm pressure transducer or piezoelectric crystal or the like can be utilized to generate electrical signals representing the fluctuations of pressure; or a temperature sensitive means such as a thermocouple, bolometer or the like can be utilized to generate electrical signals representing temperature; or, thirdly, a velocity sensitive means such as a hot wire anemometer or self-heated thermistor probe can be used to generate electrical signals representing the fluctuations of velocity. In all cases, the electrical signals are transmitted from terminals 44 and 45 of transducer 24.

While the theory behind the cylinder-disc mass flow meter is not clearly defined and should not be interpreted as being a limitation on the invention, an explanation of the probable flow characteristics behind the device is nevertheless believed to contribute to the understanding of the invention.

Referring to FIG. 2, the flow stream impinges on the nose 12. A boundary layer 21 is formed which expands in a generally V-shaped pattern along body 10 as indicated. It is critical that after detaching from the base 14, the inwardly flowing portions of the expanding boundary layer fluid interact, that is, be intersected by the disc 16 so as to shed vortices 30 as illustrated. If the boundary layer 21 is not turbulent as it detaches from the base 14, i.e., it is still in the laminar regime, it will not expand sufficiently to be intersected with the disc 16. For this reason, a trip wire 34 is fastened around the circumference of the body 10 so as to insure a turbulent flow at the base. The trip wire 34 also provides a homogeneous boundary layer of more uniform turbulent intensity and has utility, therefore, even when the boundary layer 21 is initially turbulent.

The use of a relatively smooth and contoured nose 12 on the body 10 serves to decrease the boundary layer 21. A thin boundary layer at the base 14 is required to produce a steep velocity gradient which in turn produces the requisite low base pressure $B_b$ for oscillatory flow. A further description of this phenomenon can be found in an article published by W. A. Mair at page 350 of the November 1965 issue of the Aeronautical Quarterly.

The frequency of the oscillatory flow is directly related to the mean volumeric flow rate of the flow, whereas the amplitude has been found to be proportional to the product of the density and the velocity squared. Thus a suitable sensor means, operatively exposed to the oscillatory fluid, can detect the fluctuations by detecting the associated pressure, velocity or temperature fluctuations. It can then be made to transmit a signal having a frequency characteristic proportional to the velocity of fluid flow and an amplitude proportional to the density of the fluid. When the frequency and the amplitude characteristics are separated into different signals, the different signals may be arithmetically operated upon to produce signals related to mass flow rate and total mass of fluid passing through the conduit means. Good results are obtained when the sensor means is positioned a relatively short distance downstream of the disc as described in my pending application Ser. No. 24,682, filed Apr. 1, 1970.

Referring now to FIG. 3, when a fluid such as air is flowed into the conduit 18, the flow impinges upon the curved nose 12 of the body 10 and divides as shown by the arrows 28 to flow around and by the obstruction constituted by the body 10. When the fluid flow reaches the space between the disc 16 and the flat base 14, it is disrupted or perturbed and as a result a downstream wake is generated in which the fluid flow traces an oscillatory motion as indicated by the trace line 32. Such oscillatory flow is stabilized in a fixed plane by means of the stabilizer vane 42 which orients the fluid oscillations with respect to the sensor 24 such that stabilized fluctuations of large amplitude and uniform frequency are detected. A further description of the stabilizer means can be found in the pending application by White, Ser. No. 705,061 filed Feb. 13, 1968.

Though a cylindrical body and a circular disc member have been referred to in the above discussion, the body may actually be non-cylindrical in that a cross-section need not be exactly circular nor must the elements of the curved side be exactly parallel. Likewise, the disc member may be elliptical or have some other non-circular configuration.

Because of the fluid oscillations the sensor 24 transmits from terminals 44 and 45 (FIG. 1) an alternating signal whose frequency of alternation is proportional to the velocity of fluid flow and whose amplitude is proportional to the density of the fluid and the square of the velocity of fluid flow as hereinbefore indicated. The description of the utilization of this signal to indicate mass flow rate and total mass will be deferred until the various embodiments of the signal generation means are described.

While a single transducer may be used as the sensor means for the pressure or temperature fluctuations associated with the fluid oscillation flowing along a confined path, there are times when a single transducer limits the accuracy of the measurements. In particular, a single transducer will not only sense the fluctuations due to the oscillation, but will also be sensitive to other pressure waves, hereinafter referred to as sonic vibrations, which pass down the fluid conduit. It is to be understood, however, that the word sonic was chosen for convenience only and does not imply or mean that the vibrations are only in the audible range—they can either be in the subsonic, sonic, or ultrasonic range, separately or combined. Thus, the output of such a transducer will not be representative of the frequency and amplitude of fluid oscillations and, therefore, will not give a true indication of the mass flow.

Accordingly, it is more desirable to employ a pair of transducers which are arranged in opposed relation and transverse the conduit 18, as by being diametrically opposite each other along a pipe. In this case, pulses due to sonic vibrations will be in-phase with respect to both transducers. However, the pulses due to the fluid oscillations will be out-of-phase with respect to the two transducers by substantially 180°. A further description of this arrangement is found in U.S. Pat. No. 3,314,289, filed May 11, 1964, by A. E. Rodely, entitled "Swirl Flow Meter Transducer System," which is owned by the same assignee herein.

By virtue of this in-phase relation of the sonic vibration and the out-of-phase relation of the pulses due to the fluid oscillations, an output which is responsive only to the out-of-phase pulses can be provided by connecting the electrical outputs of both transducers in parallel or series with each other or by using an electronic differential amplifier. With such electrical connection arrangements, the outputs due to pulses resulting from sonic vibrations will cancel each other due to their being in-phase with respect to both transducers. However, the outputs responsive to pulses from the oscillatory fluid, and which are out of phase with each other, will provide a combined output which is responsive only to the out-of-phase pulses.

A variation to this approach is the use of a single differential transducer having inputs connected to two diametrically opposite points of the conduit. In this case, the in-phase pulses due to sonic vibrations will be in opposition at the differential transducer and this will produce substantially no output. On the other hand, the out-of-phase pulses due to the oscillating flow will produce an output which is double that of a single transducer connected to only one point along the conduit.

In accordance with one preferred embodiment of the invention, a sensor means comprising a pair of pressure transducers 40 and 40' is arranged in the wall of the conduit 18 downstream of the disc 16 and upstream of the exit opening 22. The transducers 40 and 40' are arranged in diametrically opposed relation. As stated, pressure transducers such as 40 and 40' are sensitive not only to the pressure pulses due to the oscillating fluid, but are also sensitive to sonic waves or vibrations passing along the conduit. With respect to sonic vibrations of the fluid, a sound wave traveling along the conduit will effect a positive pressure pulse against each of the transducers 40 and 40' at the same instant. In other words, the pressure pulses due to sonic vibrations are in phase with respect to both transducers 40 and 40'. This is indicated by the arrows 41 and 41' of FIG. 4, which represent the pressure pulses due to sonic vibration.

However, with respect to pressure pulses due to the oscillating fluid, the pulses on the two transducers 40 and 40' are substantially 180° out of phase as indicated by the arrows 43 and 43'. That is, the low pressure lobe of the oscillating fluid is effective upon transducer 40', for example, at substantially a 180° angular displacement in time from its effect upon the transducer 40. A similar phenomena occurs for temperature and velocity pulses.

Figure 5:
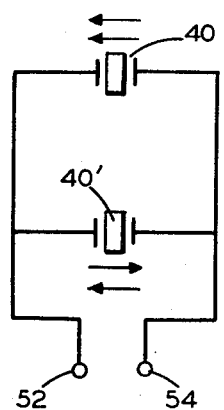
FIG. 5 is a schematic circuit of the parallel connection of the transducers of FIG. 3 to yield an electrical signal representing the hydrodynamic state of the fluid in the tube of FIG. 3.
Figure 6:
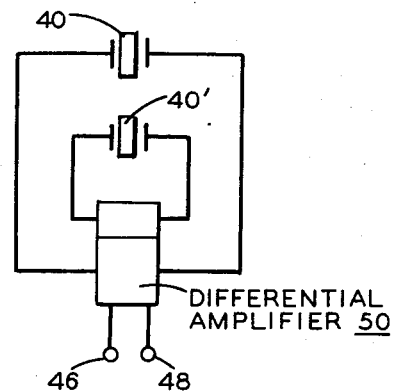
FIG. 6 is another schematic circuit diagram wherein the signal outputs of the transducers of FIG. 3 are connected to a differential amplifier which produces an electrical signal representing the hydrodynamic state of the fluid.

It is possible to take advantage of these relationships by connecting the two transducers 40 and 40' in parallel or in series in an electrical circuit. With the arrangement shown in FIG. 5, the in-phase pressure, velocity or temperature pulses due to sonic vibrations oppose each other. Thus, mutual cancellation occurs. The same results are obtained with the arrangement of FIG. 6 wherein the transducers are connected to a differential amplifier 50. If desired, the transducers or sensor means can be connected in series. In the series network the differential amplifier is not required. On the other hand, the out-of-phase pressure or temperature pulses due to the oscillating fluid are additive and constitute the combined output of the two transducers. As a result, the in-phase pressure, temperature or velocity pulses across the fluid conduit means 18 are greatly reduced in value if not completely nullified, and the out-of-phase pressure, temperature or velocity pulses may, therefore, be measured both as to frequency and as to amplitude. The out-of-phase output signals are applied to terminals 52 and 54 of the parallel transducer embodiment of FIG. 5 and terminals 46 and 48 of the differential amplifier embodiment of FIG. 6. The utilization of the signal so generated to indicate mass flow will be hereinafter described.

It should be noted that several pairs of transducers spaced angularly around the conduit means would increase the number of pulses per unit of time and enable a more accurate evaluation of the flow rate to be made.

Figure 7:
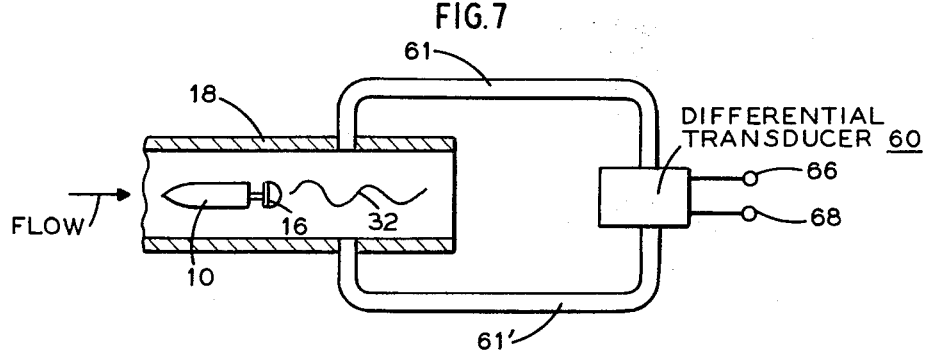
FIG. 7 is a longitudinal sectional view, partially in schematic, of an alternate arrangement of the transducers for generating signals representing fluid flow in a conduit.

In the embodiment of the invention shown in FIG. 7 a single differential pressure transducer 60 is subjected to pressures at a pair of diametrically opposed points along the conduit 18. For this purpose, a pair of pressure taps 61 and 61' are connected in communication with the conduit 18 at a pair of respective diametrically opposite points downstream of the disc 16. The other ends of taps 61 and 61' are connected to opposite sides of the conventional differential transducer 60.

With the foregoing arrangement, in-phase pressure pulses or fluctuations, such as caused by sonic vibrations, will not result in any output from differential transducer 60, because at transducer 60, these in-phase pressure pulses oppose each other. However, the out-of-phase pressure pulses or fluctuations due to the oscillating fluid will produce an output which is twice that of a single pressure transducer connected at only one point along the flow path. Thus, the differential transducer arrangement of FIG. 7 effects the elimination of extraneous signals and, at the same time generates pressure pulses signals which are amplified by a factor of two. The signals generated by differential transducer 60 are transmitted from terminals 66 and 68.

Although the signals transmitted by the sensor 24 (FIG. 1), the transducers 40 and 40' (FIG. 5), the differential amplifier 50 (FIG. 6) and the differential transducer 60 (FIG. 7) have been referred to as pulses, it should be apparent that by virtue of the oscillation of the fluid these signals are more nearly sinusodial and the pulses are actually the lobes of the sinusoids. Since the signals are sinusoidal they have two prime characteristics, i.e., frequency and amplitude which can be converted by conventional circuits to two further signals whose amplitudes represent, respectively, the instantaneous frequency and amplitude of the sinusodial output signal.

Now, it is readily demonstrated that the product of the density of the fluid and the square of the velocity of the fluid divided by the velocity of the fluid yields the product of density and velocity. It should be noted that the velocity of fluid flow is proportional to volumetric flow rates. Accordingly, the result of such a division yields a mass flow rate. It will be recalled that the frequency of the transducer generated signals is proportional to the velocity of fluid flow and the amplitude of the transducer generated signals is proportional the product of the density and the square of the velocity of fluid flow. Therefore, if the signal representing the frequency of the pressure, velocity or temperature fluctuations because of the oscillation is divided into the signal representing the amplitude of the pressure, velocity or temperature fluctuations, the resulting quotient signal is proportional to or represents the mass flow rate of the fluid through the fluid conduit. The apparatus of FIG. 8 performs this function.

The inputs 70 and 72 of the amplifier 74 thereof can be connected to any of the signal outputs of the above described embodiments and amplifier 74 will receive a signal having frequency and amplitude characteristics. The output of amplifier 74 is connected to the input of conventional frequency discriminator 76 which may be of the Foster-Seely type. Discriminator 76 transmits a signal from its output which is proportional to the frequency of the signal received at its input. The output of amplifier 74 is also connected to the input of conventional amplitude detector 78 which includes a rectifier and a filter. The output of detector 78 transmits a signal proportional to the amplitude of signal received at its input. The output of discriminator 76 is fed to the divisor input, and the output of detector 78 to the dividend input of conventional analog divider circuit 80. Circuit 80 is a conventional operational amplifier well known in the analog computer art to simulate division and transmits from it output a signal representing the quotient of the dividend and divisor operands represents by signals fed to its two inputs. In the situation described herein the signal at the output of circuit 80 represents the mass flow rate of the fluid passing through the conduit. The output of circuit 80 may be coupled to a conventional meter 82 which is calibrated to indicate mass per unit time. If desired, the output of circuit 80 can be connected to a conventional analog-to-digital converter so that the mass flow rate can be telemetered in digital form to a remote station.

If total mass of fluid flowing through the conduit is desired the output of circuit 80 can be connected to an integrator means 84 of a conventional type such as D.C. motor driven clockwork mechanism whose dial is calibrated in units of mass.

There has thus been shown improved methods and apparatus for indicating mass flow rates and total mass transfer of fluids which utilize the oscillatory wake generated behind a bluff body in a conduit with a disc-like member appended downstream. By exploiting the oscillatory phenomenon and generating therefrom a signal whose frequency represents the velocity of fluid flow and whose amplitude represents the kinetic energy of a unit volume of fluid, it is possible to simplify and readily obtain an indication of mass flow rate.

The invention is inherently a low pressure loss device due to the small, contoured obstruction the bluff body presents to oncoming flow; it does not, therefore, contribute appreciably to the pipeline pumping requirements or to cavitation effects within the conduit. It has a simple internal geometry and can be machined to close tolerances which will allow replacement in the field without the necessity of removing the entire instrument for recalibration. Indeed, the original factory calibration may also be done "dry," i.e., without actually installing the meter in a fluid test loop but rather, by simply measuring the critical dimensions, which are few, and upon which the calibration is solely dependant. Additionally, the one device can provide an indication of flow velocity or volumetric flow rate as well as an indication of mass flow as previously indicated.

What is claimed is:

1. Apparatus for use in a mass flow meter comprising a flow tube having an internal obstruction mechanism around which the fluid flows as it moves through the tube; said obstruction mechanism having a bluff downstream face extending generally crosswise of the tube so that vortical pulses are periodically formed beyond said face and thence shed in a linear fashion from the flowing mainstream; said obstruction mechanism comprising an elongated cylindrical member and flat disc; said cylindrical member having a round frontal nose to receive the oncoming stream, and said disc being located a short distance downstream from the cylindrical member to intercept fluid leaving the cylindrical member; said disc having a flat downstream face that constitutes the aforementioned bluff face; said obstruction mechanism further comprising a stabilizer vane attached to the downstream face of the disc and extending normal to the plane of the disc to stabilize the pulses in the vane plane; sensor means located downstream from the obstruction mechanism for exposure to the vortical pulses; said sensor means being constructed to produce an electrical signal having a frequency varying according to the vortex shedding rate, and an amplitude varying according to the vortex fluid density; means coupled to the sensor means for producing a first output signal proportional to the aforementioned frequency; and means coupled to the sensor means for producing a second output proportional to the aforementioned amplitude.

References Cited

UNITED STATES PATENTS

| 3,279,251 | 10/1966 | Chanaud | 73—194 |
| 3,370,463 | 2/1968 | Chanaud | 73—194 |

OTHER REFERENCES

Mair "The Effect of a Rear Mounted Disc on the Drag of a Blunt-Based Body of Revolution," in Aeronautical Quarterly, November 1965, pp. 350–360.

JAMES J. GILL, Primary Examiner

H. GOLDSTEIN, Assistant Examiner